United States Patent
Choi (10) Patent No.: US 7,738,247 B2
(45) Date of Patent: Jun. 15, 2010

(54) REMOVABLE AND REPLACEABLE DOCKING UNIT

(75) Inventor: Thomas Choi, Edison, NJ (US)

(73) Assignee: SDI Technologies Inc., Rahway, NJ (US)

( * ) Notice: Subject to any disclaimer, the term of this patent is extended or adjusted under 35 U.S.C. 154(b) by 0 days.

(21) Appl. No.: 11/620,292

(22) Filed: Jan. 5, 2007

(65) Prior Publication Data

US 2008/0164845 A1 Jul. 10, 2008

(51) Int. Cl.
*H05K 5/00* (2006.01)
(52) U.S. Cl. .................................. 361/679.43
(58) Field of Classification Search ........... 361/686; 345/204; 40/448; 439/10, 13, 137
See application file for complete search history.

(56) References Cited

U.S. PATENT DOCUMENTS

| 6,833,989 B2 | 12/2004 | Helot et al. |
| 7,095,867 B2 | 8/2006 | Schul et al. |
| 7,167,167 B2 * | 1/2007 | Capurso et al. ............. 345/204 |
| 7,257,465 B2 * | 8/2007 | Perez et al. ................. 700/284 |
| 2009/0009957 A1 * | 1/2009 | Crooijmans et al. ......... 361/686 |

* cited by examiner

*Primary Examiner*—Jean F Duverne
(74) *Attorney, Agent, or Firm*—Arent Fox LLP (57) ABSTRACT

A removable/replaceable docking unit includes a cradle, a dock connector extending through an opening in a bottom portion of the cradle, a circuit board to which the dock connector is integrally attached, a wire connector integrally attached to the circuit board at a side thereof opposite the dock connector and the dock connector and the wire connector communicatively coupled via the circuit board and a removable connector provided in the cradle for removably connecting the docking unit to an electronic device.

17 Claims, 9 Drawing Sheets

REMOVABLE AND REPLACEABLE DOCKING UNIT

BACKGROUND OF THE INVENTION

1. Field of the Invention

The present invention is directed to a removable and replaceable docking unit. More particularly, the present invention is directed to a removable and replaceable docking unit allowing for connection between a portable electronic device and another electronic device.

2. Description of the Related Art

Portable electronic devices are in widespread use. Portable electronic devices must include a power supply for powering the device. Various types of power supplies are available for use in portable electronic devices. For example, more and more portable electronic devices are being designed to run on rechargeable batteries, such as nickel-cadmium, lithium-ion, or nickel-metal hydride batteries. For ease of use, most electronic devices that run on rechargeable batteries are provided with means for allowing the batteries to be charged within the device. Hence, people often speak of recharging their cellular phone, for example, as opposed to recharging the battery that powers the cellular phone. In order to recharge these batteries, portable electronic devices can be connected to a second power source, such as supplied by an AC electrical outlet, for example.

Regardless of a type of second power source, if the rechargeable battery is charged within the portable electronic device, the portable device must, ordinarily, be physically connected to the second power source. Often, portable electronic devices such as cellular phones and personal digital assistants (PDAs) are provided with a port to which a power adapter or other cable may be connected, which, when connected to a power source, charges the battery of the device. In the case of the portable electronic device sold under the trademark IPOD by Apple Computer, Inc., for example, a dock connector to USB or FireWire cable may be used to attach the device to a computer, which in turn then charges its battery.

Other types of chargers, sometimes called a "base" or "desktop charger," have a "docking station" into which a portable electronic device may be directly inserted to charge the battery. Some type of interface or connector is provided within the docking station to electrically connect the portable electronic device to the charger. Such "base" or "desktop" type chargers often plug directly into a wall outlet via an integral power cord.

In addition, some accessory devices are provided with docking stations into which a portable device may be docked to allow electrical and mechanical coupling between the devices. An example of such an accessory device is an amplifier/radio/clock/speaker system into which a personal audio media player may be docked to allow audio media played by the personal audio media player to be output through the speaker system. In such cases, a portable electronic device may be charged via the accessory device.

All too often, an interface for connecting a charger or accessory device to a portable electronic device becomes unusable for any of a variety reasons. Often, the connection involves pins to be inserted into a port or connector provided on the portable device. Frequently, the pins become damaged, e.g., broken or bent, and connection between the charger or accessory device and the portable device becomes impossible. In such cases, the entire charger or accessory device must be replaced due to only a few broken or bent pins.

In addition, portable electronic device manufacturers are constantly upgrading their products. Often, second, third or later generation electronic devices are not compatible with earlier generation accessories, such as chargers, adapters, etc. In such cases, the consumer is forced to purchase all new accessory devices when upgrading to a newer generation product. For example, a consumer may own a certain brand of cellular phone and all the accessory devices, e.g., an AC adapter, car charger, and computer syncing cable, that go with it. If the consumer trades in that cellular phone for an upgraded version, the consumer is often disappointed to discover that their accessory devices, e.g., AC adapter, car charger, and computer syncing cable, are now obsolete or incompatible (i.e., due to the purchase of the newer phone). Accordingly, the consumer must now purchase new accessory devices often only because the port for connecting the cellular phone to the accessory device has changed.

Further, a charger or accessory device may appear to quit working. For example, the accessory device itself may be operational, but its interface is defective. However, there is currently no convenient way for an average consumer to determine the cause of the problem, and hence, the entire accessory device must be replaced. Moreover, as previously stated, even if it is determined that the interface is defective, it is still currently necessary to replace the entire accessory device.

Needless to say, the above situations result in an incredible waste of resources and money, contribute to environmental waste and are expensive drawbacks to portable electronic devices.

Thus, there is a need for means by which an entire electronic device need not be replaced due to a damaged or non-operational dock connector.

There is a further need for means by which an entire electronic device need not be replaced due to a change in a port or connector for connecting a portable device to the electronic device.

In addition, there is a need for means by which a damaged or non-operational electronic device may be easily tested by a consumer.

SUMMARY OF THE INVENTION

The present invention is therefore directed to a docking unit, which substantially overcomes one or more of the problems due to the limitations and disadvantages of the related art.

The present invention is further directed to an electronic device having a docking unit, which substantially overcomes one or more of the problems due to the limitations and disadvantages of the related art.

It is therefore a feature of an embodiment of the present invention to provide a removable/replaceable docking unit.

It is another feature of an embodiment of the present invention to provide an electronic device comprising a removable/replaceable docking unit.

It is a further feature of an embodiment of the present invention to provide a portable electronic device charger comprising a removable/replaceable docking unit.

It yet another feature of an embodiment of the present invention to provide a portable device charger capable of charging portable electronic devices having different types of connector ports.

In an effort to provide these and other features and advantages of the present invention, a removable docking unit is provided including a cradle, a dock connector protruding through an opening in a bottom portion of the cradle, a circuit board to which the dock connector is integrally attached, a wire connector integrally attached to the circuit board at a side thereof opposite the dock connector, the dock connector and the wire connector communicatively coupled via the circuit board, and means, provided in the cradle, for removably connecting the docking unit to an electronic device. Based on the present invention, the docking unit thereby allows the wire connector of the docking unit to communicatively engage a wire connector of an electronic device to which the docking unit is removably attached and the dock connector to communicatively engage a wire connector of a portable electronic device.

The means for removably attaching the docking unit to an electronic device comprises a removable connector. The removable connector may include a screw hole and a screw, a clamp, a gripping material, or any other suitable means for removably connecting the docking unit to an electronic device.

In an embodiment of the present invention, the circuit board is attached to a side of the bottom of the cradle opposite the dock connector, and the docking unit further includes a support bracket removably attached to the cradle, the support bracket supporting the circuit board and the dock connector.

In some embodiments of the present invention, the wire connector of the docking unit receives a wire connector of an electronic device to which the docking unit is removably attached.

In some embodiments of the present invention, the cradle of the docking unit is provided with an insert hook for receiving an insert to adjust an effective size of the cradle in accordance with a size of a portable electronic device to be inserted therein.

It is another feature of an embodiment of the present invention to provide an electronic device for charging a portable electronic device that includes a housing connectable to a power supply, a device receiving portion provided in and removably connected to a top portion of the housing, a dock connector provided in the device receiving portion to which the portable electronic device may be connected and means provided in the device receiving portion for removably connecting the device receiving portion to the top portion of the housing.

It is another feature of an embodiment of the present invention to provide an electronic device for charging a portable electronic device that has a housing and a wire connector located in the housing, a docking unit removably attached to the housing and including a cradle provided with means for removably attaching the docking unit to the housing, a dock connector positioned at a bottom portion of the cradle, a circuit board to which the dock connector is integrally attached, a dock wire connector integrally attached to the circuit board at a side opposite the dock connector, the dock connector and the dock wire connector communicatively coupled to the circuit board and the dock wire connector communicatively engaging the wire connector of the electronic device.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions may be exaggerated for clarity of illustration. In addition, in the figures, like reference characters refer to like elements throughout.

Figure 1:
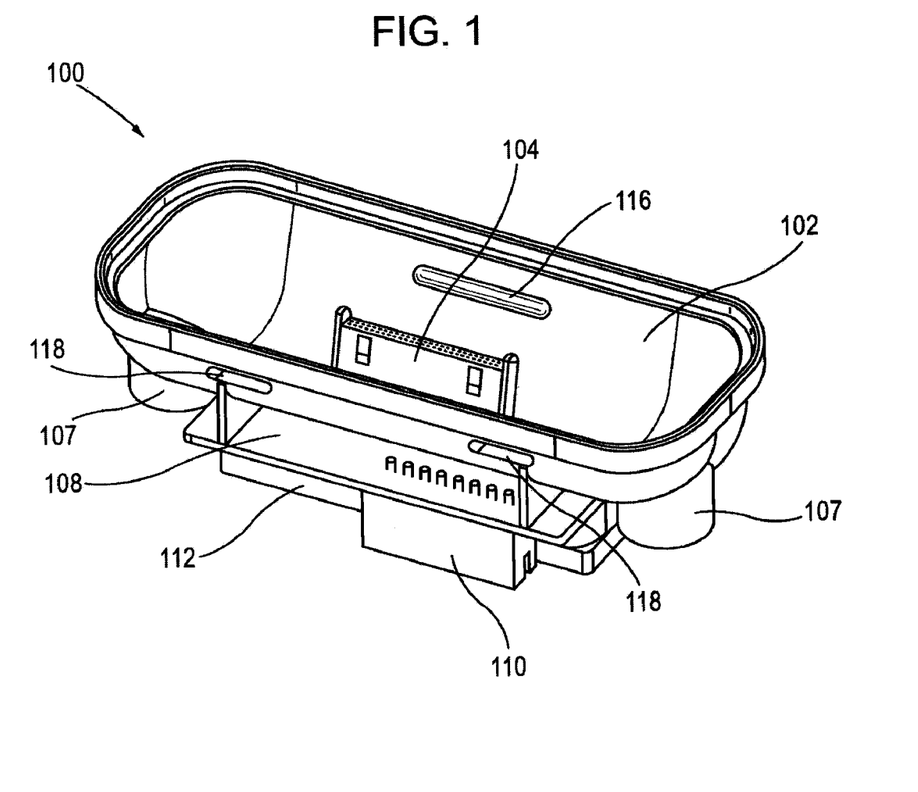
FIG. 1 illustrates a front perspective view of an example of a removable docking unit according to an embodiment of the present invention.
Figure 2:
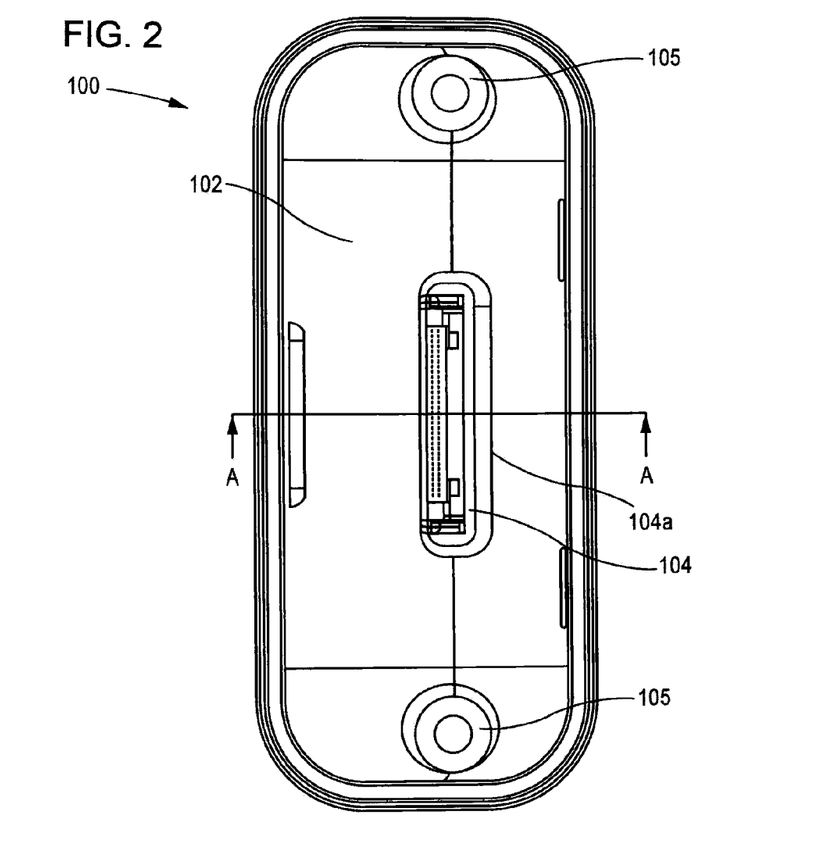
FIG. 2 illustrates a plan view of an example of a removable docking unit according to an embodiment of the present invention.
Figure 3:
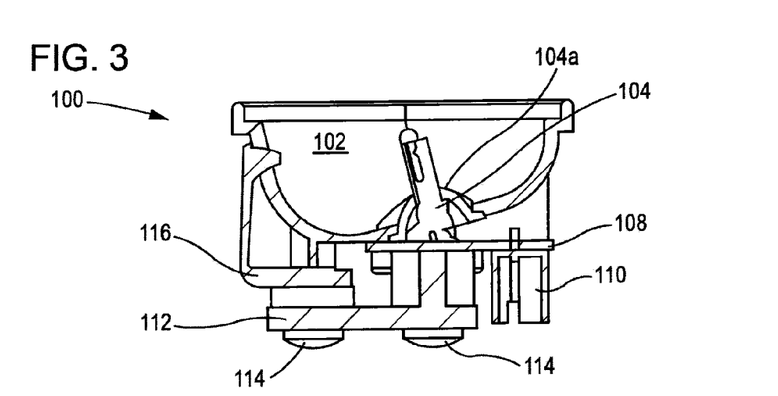
FIG. 3 illustrates a sectional view taken along line A-A of FIG. 2.
Figure 4:
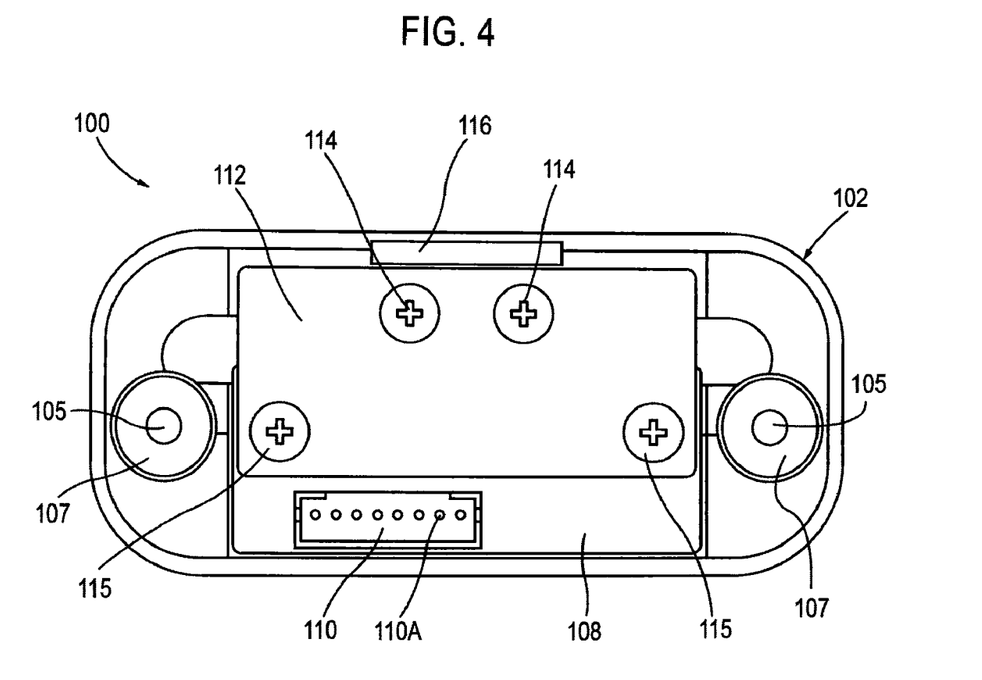
FIG. 4 illustrates a bottom side view of an example of a removable docking unit according to an embodiment of the present invention.
Figure 5:
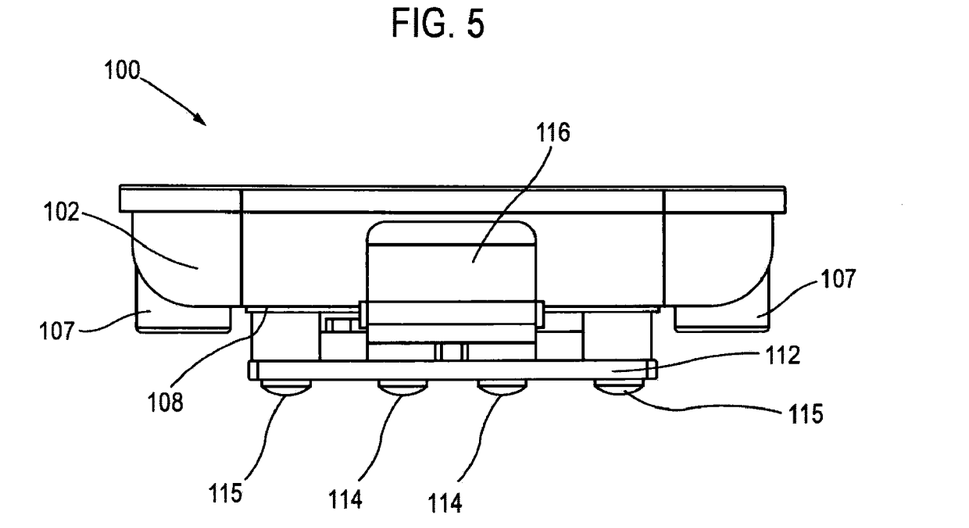
FIG. 5 illustrates a front elevational view of an example of a removable docking unit according to an embodiment of the present invention.
Figure 6:
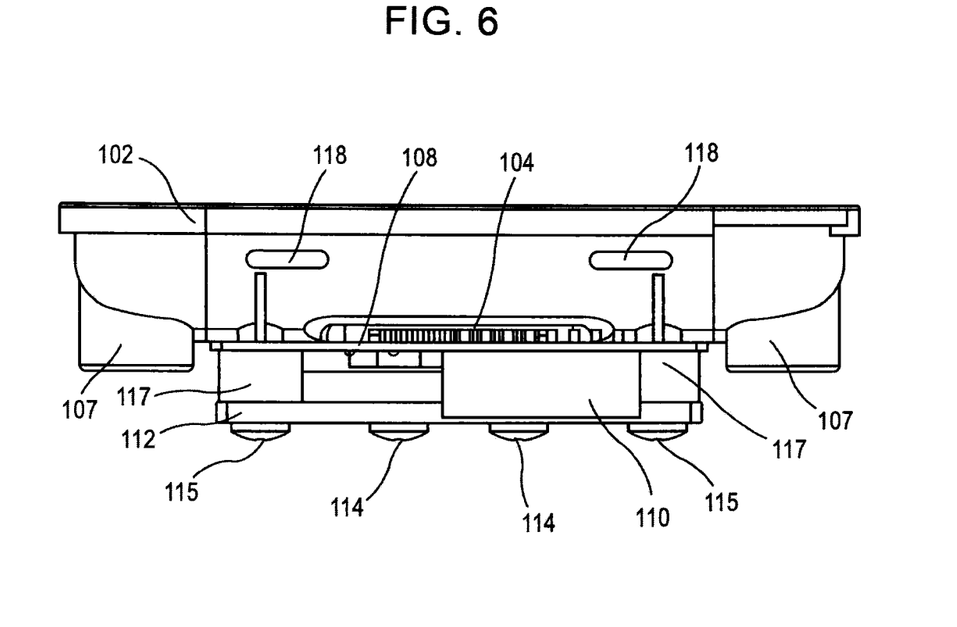
FIG. 6 illustrates a rear elevational view of an example of a removable docking unit according to an embodiment of the present invention.
Figure 7:
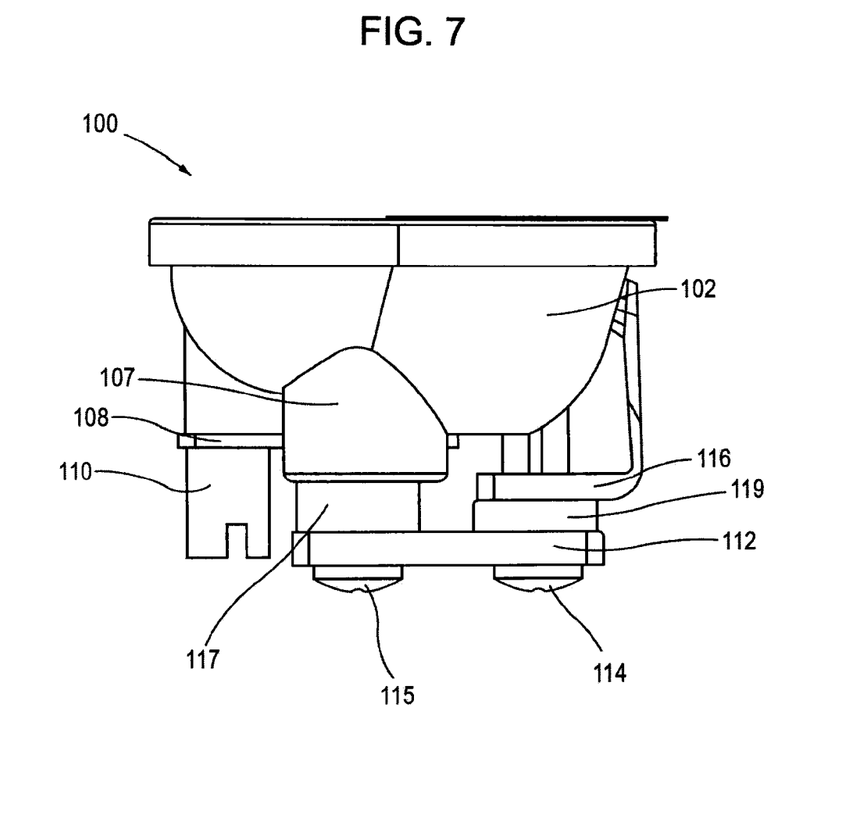
FIG. 7 illustrates a side elevational view of an example of a removable docking unit according to an embodiment of the present invention.
Figure 8:
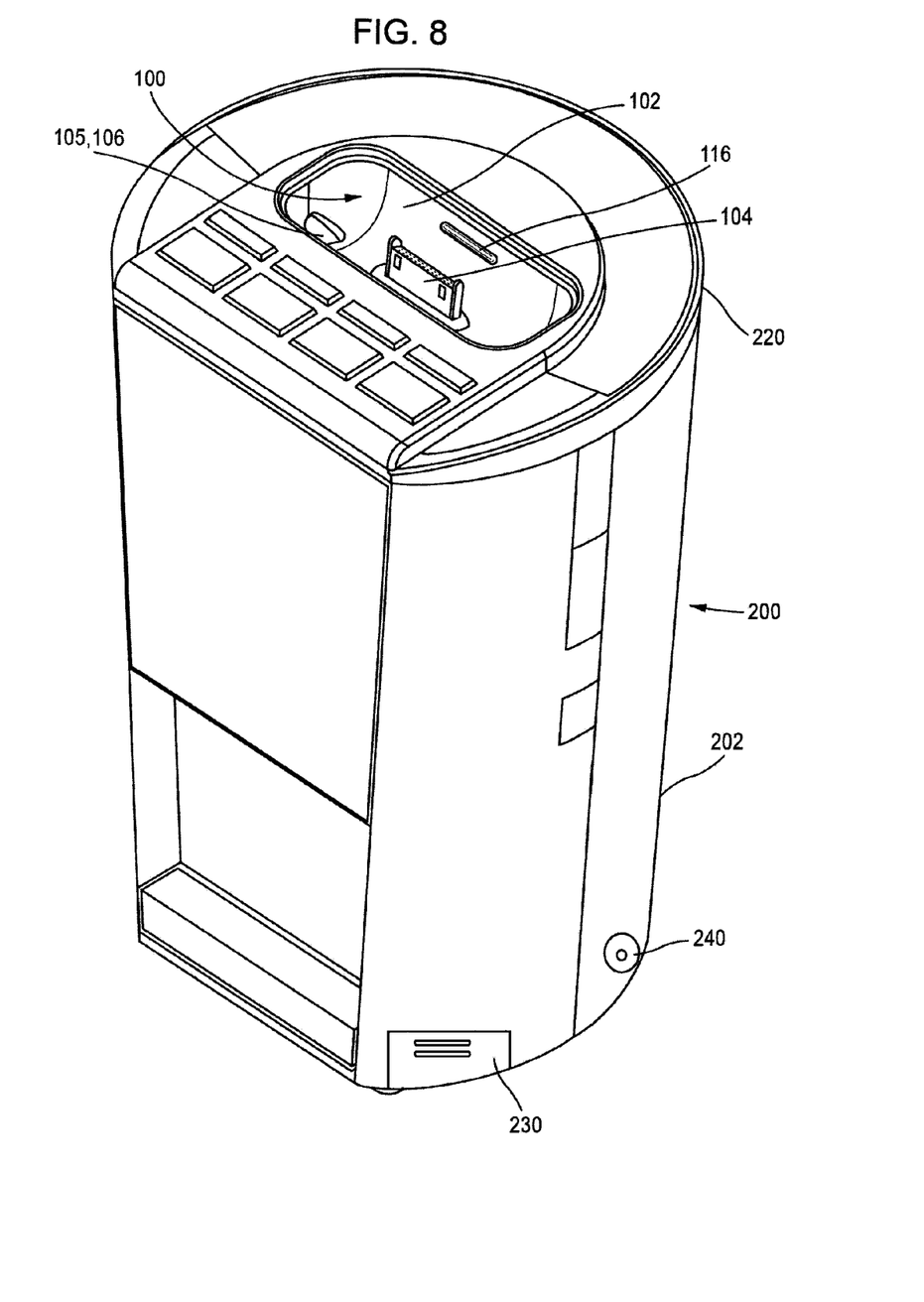
FIG. 8 illustrates a perspective view of an example of a removable docking unit according to an embodiment of the present invention, in which the removable docking unit is incorporated in an electronic device.
Figure 9:
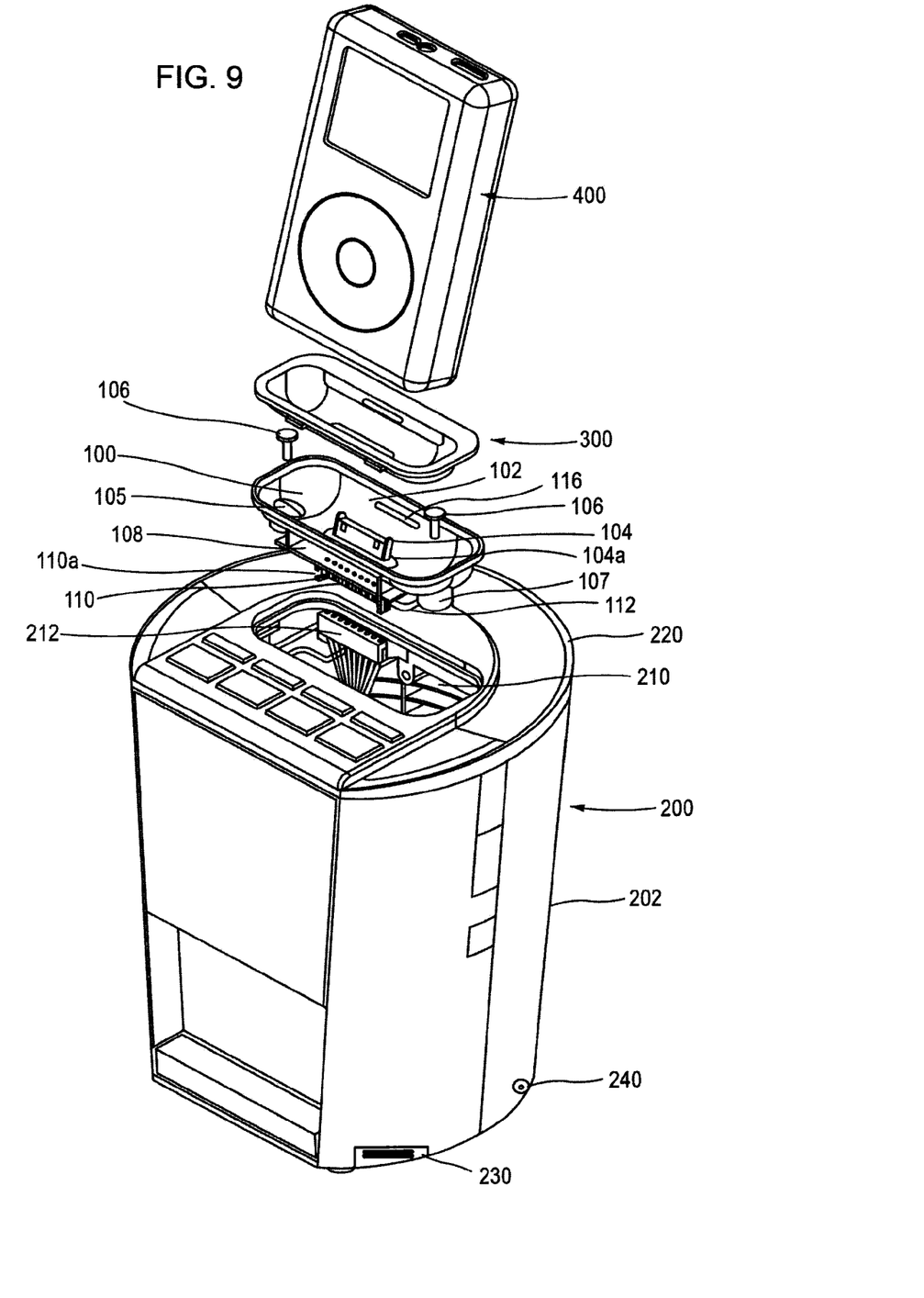
FIG. 9 illustrates an exploded view showing the removable docking unit according to an embodiment of the present invention for incorporation in the electronic device and for use in conjunction with a portable electronic device.
Figure 10:
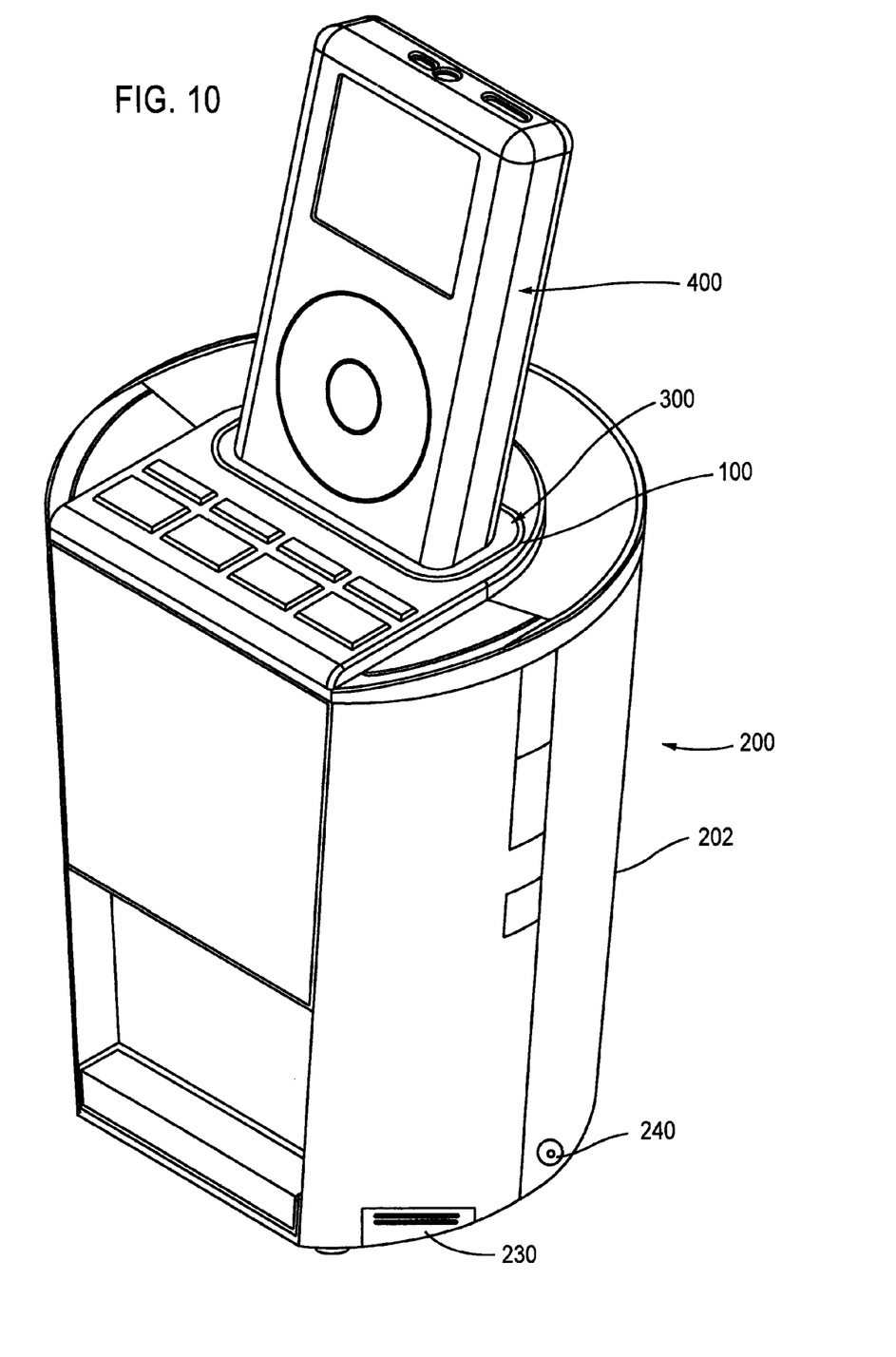
FIG. 10 illustrates a perspective view showing the portable electronic device of FIG. 9 insertable in the removable docking unit according to an embodiment of the present invention in which the removable docking unit is incorporated in the electronic device.

FIGS. 1-7 illustrate various views of an example of a removable/replaceable docking unit according to an embodiment of the present invention and FIGS. 8-10 illustrate various views of the removable/replaceable docking unit for use in conjunction with an electronic device and/or a portable electronic device.

As shown in the figures, a removable/replaceable docking unit (referred to interchangeably hereinafter as "removable/replaceable docking unit," "removable docking unit," "docking unit" and "device receiving portion") 100, in accordance with an embodiment of the present invention, includes a cradle 102, a dock connector 104, a printed circuit board (PCB) 108, and a dock wire connector or socket 110 with pins 110a. The dock connector 104 is provided integral to the PCB 108 through an opening or slot 104a provided in the bottom of the cradle 102. The wire connector 110 is communicatively coupled or attached to the PCB 108 at a side of the PCB 108 opposite the dock connector 104. The dock connector 104 and the wire connector 110 are communicatively coupled via the PCB 108.

As shown in FIGS. 8-10, the dock connector 104 is designed to engage a port of a portable electronic device 400 thereby communicatively coupling the portable electronic device 400 to the docking unit 100. In addition, the wire connector 110 is designed to receive a wire connector 212 of an electronic device 200 to communicatively couple the removable docking unit 100 to the electronic device 200. An electronic device 200 coupled to the wire connector 110 and a portable electronic device 400 coupled to the dock connector 104 are communicatively coupled by the docking unit 100 of the present invention.

The cradle 102 of the docking unit 100 is provided with holes 105, which penetrate the cradle 102. Hollow cylinders 107 protrude from the bottom side of the cradle 102 surrounding the holes 105. Screws, such as screws 106 of FIG. 9, may be inserted into the holes 105 and hollow cylinders 107 of the cradle 102 and secured in a top portion of an electronic device 200 to mechanically and removably attach and secure the docking unit 100 to the electronic device 200.

Thus, by the present invention, the docking unit 100 is removably attached to the electronic device 200 by screws and a wire connector 212 of the electronic device 200 is engaged or "plugged into" the wire connector 110 of the docking unit 100 to mechanically and electrically couple the docking unit 100 to the device 200. The docking unit 100 may be removed from the electronic device 200 by removing the screws 106 and unplugging the wire connector 212 from the wire connector 110. Therefore, if the removable docking unit 100 should become non-operational or damaged, it is possible to remove the docking unit 100 from the electronic device 200 and replace it with a new removable docking unit. Thus, the entire electronic device need not be replaced due to non-operational or damaged docking unit. Similarly, if the dock connector 104 of the docking unit 100 becomes obsolete or incompatible due to the upgrading of a portable electronic device, rather than replacing the entire electronic device, it is possible to remove the docking unit 100 from the electronic device and replace it with a docking unit having an appropriate dock connector for the upgraded device. Thus, the entire electronic device need not be replaced due to an obsolete or incompatible dock connector.

In addition, if an electronic device having the removable docking unit 100 attached thereto fails, the docking unit 100 can be replaced with a different docking unit to aid in determining a cause of the failure of the electronic device. If only the docking unit has failed, the device should work with the new docking unit attached. Thus, the removable docking unit of the present invention may be used to aid in troubleshooting an electronic device, and again, the entire electronic device need not be replaced in the event of a failed or damaged docking unit or connector. The removable docking unit 100 of the present invention, however, also allows for an upgrade or replacement of the electronic device based on, for example, new software configurations or improvements in the electronic device itself.

Referring back to the figures, the removable docking unit 100 further includes a PCB support bracket 112 and an insert hook 116 attached to the cradle 102. The insert hook 116, the cradle 102 and the PCB support bracket 112 are removably attached via screws 114 screwed through the PCB support bracket 112, through the insert hook 116, and into a bottom side of the cradle 102. In addition, the PCB support bracket 112, PCB 108, and cradle 102 are removably attached via screws 115 screwed through the PCB support bracket 112 through the PCB 108 and into the bottom side of the cradle 102. Screws 114 and screws 115 do not penetrate the cradle 102. Non-conductive screw guides 119 are provided integral to the PCB support bracket 112 to surround the screws 114 between the PCB support bracket 112 and the insert hook 116. Similar non-conductive screw guides (not shown) are provided integral to the cradle 102 to surround the screws 114 between the cradle 102 and the insert hook 116, thereby insulating the screws 114 from the PCB 108. In addition, non-conductive screw covers 117 are provided to cover screws 115 between the PCB support bracket 112 and the PCB 108.

The cradle 102 is further provided with insert slots 118. The insert hook 116 and insert slots 118 are provided for inserts, such as for example, insert 300 as shown in FIGS. 9 and 10, which may be inserted within the docking unit 100 to allow different sized devices to be securely docked within the docking unit 100. The insert 300 effectively changes a size of the cradle 102 to provide a snug fit for differently sized devices to be docked therein.

FIGS. 8 and 10 illustrate the exemplary removable docking unit of FIGS. 1-7 in which the removable docking unit is incorporated in an electronic device 200 with and without a portable electronic device 400 inserted therein, respectively. FIG. 9 illustrates an exploded view showing a portable electronic device 400 with an insert 300 insertable into the removable docking unit 100 of the present invention which in turn is insertable in the electronic device 200.

Particularly as shown in FIGS. 8-10, the electronic device 200 for powering and/or charging a portable electronic device 400 has a housing 202 with a top portion 220 having a wire connector 212 positioned in a cavity 210 of the housing 202. The docking unit 100 of the present invention is accordingly removably attachable or engageable to and from the wire connector 212 of the electronic device 200 and is secured to the electronic device 200 by screws 106. Power to the electronic device 200 for powering and/or charging the portable electronic device 400 may be provided by a variety of external and/or internal power sources, including, for example, an external source via a convertor that can convert alternating current (AC) to direct current (DC) or vice versa or via an external battery or battery pack through a power adapter 240. Additionally, power may be provided from an internal source located in the electronic device 200 via one or more batteries stored within a battery compartment 230.

As illustrated in the figures, the removable docking unit 100 for incorporation in the electronic device 200 allows for replacement of the docking unit for any reason, including failure of or damage to the current docking unit as well as the need or desire to change a dock connector of the docking unit to accommodate a portable device having a different dock or port for connecting to the electronic device. Thus, the electronic device 200 having a removable docking unit of the present invention may be used with a multitude of different portable electronic devices. The provision for inserts provided by a removable docking unit of the present invention facilitates the ability to use a docking unit and/or an electronic device equipped with a docking unit of the present invention with a multitude of portable electronic devices.

In another embodiment of the present invention, the electronic device 200 can also function as a portable electronic device charger incorporating a removable docking unit or device receiving portion 100. By the portable electronic device charger of the present invention, in the event the device receiving portion or dock connector of the device receiving portion becomes damaged or obsolete, the device receiving portion may be removed from the charger and replaced with a new and/or upgraded device receiving portion, thereby restoring the usability of the portable electronic device charger.

The portable electronic device charger of the present invention includes electronic devices, such as for example, cellular phone chargers, wireless phone chargers, PDA chargers, personal media player chargers (such as MP3 player chargers, IPOD chargers, CD player chargers, etc.), laptop/notebook/tablet computer chargers, rechargeable toy chargers, rechargeable tool chargers, portable television chargers, radio (including short-wave radio) chargers and chargers for multi-function units such as combination MP3 player/cellular phone devices, etc. In each case, the dock connector is designed to engage a portable electronic device to be charged by the charger and the wire connector of the device receiving portion is designed to engage a wire connector of the charger. Since the device receiving portion or docking unit itself is relatively small and easy to mass produce, consumers can save a tremendous amount of money by merely replacing the docking unit when/if it becomes damaged or upgraded and salvaging the bulk of the electronic device. In addition, the removable docking unit of the present invention may be used to connect a portable device compatible with the docking unit to any of a variety of electronic devices also compatible with the docking unit. Moreover, widespread use of the present invention will enormously reduce waste production since it will no longer be necessary to throw out an entire electronic device every time a few connection pins break or are bent or a port of a portable electronic device is changed.

The removable docking unit of the present invention has been described as being removably attached to an electronic device/portable electronic charger and portable electronic device as shown in the figures. However, the present invention is in no way limited to such applications. The concept and devices of the present invention may be easily applied to electronic accessory devices for portable media players and the like, such as amplifier/clock/radio/speaker systems, wherein the removable docking unit includes a dock connector designed for use with portable media players, such as MP3 players, IPODs, etc., and the wire connector is designed for use with such systems.

The present invention is further compatible with PDAs and electronic devices for charging, updating and writing/reading information to and from the PDAs.

Exemplary embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

In addition, it should be noted that similar or like parts of all embodiments of the present invention may be interchanged without exception.

What is claimed is:

1. A replacement docking unit of an electronic device configured to connect a portable electronic device, comprising:
a cradle configured to removably accept a compatible portable electronic device;
a custom dock connector extending through an opening in a bottom portion of the cradle configured to connect to the compatible portable electronic device;
a circuit board to which the dock connector is integrally attached;
a wire connector integrally attached to the circuit board at a side thereof opposite the dock connector configured to connect to the electronic device, the dock connector and the wire connector communicatively coupled via the circuit board; and
means provided in the cradle for removably connecting the replacement docking unit to the electronic device in place of an original docking unit of the electronic device.

2. The docking unit as claimed in claim 1, wherein the means for removably connecting the docking unit to an electronic device includes a removable connector.

3. The docking unit as claimed in claim 2, wherein said removable connector comprises at least one of a screw hole and a screw, a clamp, and a gripping material.

4. The docking unit as claimed in claim 1, wherein the circuit board is attached to a side of the bottom of the cradle opposite the dock connector, and the docking unit further comprises a support bracket provided at a side of the circuit board opposite the cradle and removably attached to the cradle for supporting the circuit board and the dock connector.

5. The docking unit as claimed in claim 1, wherein the wire connector of the docking unit receives a wire connector of an electronic device to which the docking unit is removably attached.

6. The docking unit as claimed in claim 1, wherein the cradle is provided with an insert hook for receiving an insert to adjust an effective size of the cradle in accordance with a size of a portable electronic device to be inserted therein.

7. An electronic device for charging a portable electronic device comprising:
a housing having a wire connector positioned in the housing;
a replaceable docking unit removably attached to a top portion of the housing, the docking unit including a cradle with a top portion configured to removably accept a compatible portable electronic device and the cradle being provided with means for removably attaching the docking unit to the top portion of the housing; and
a custom dock connector positioned at a bottom portion of the cradle, a circuit board to which the dock connector is integrally attached, a dock wire connector integrally attached to the circuit board at a side opposite the dock connector, the dock connector and the dock wire connector communicatively coupled to the circuit board and the dock wire connector communicatively engaging the wire connector of the electronic device.

8. The electronic device as claimed in claim 7, wherein the means for removably attaching the docking unit to the top portion of the housing includes a removable connector.

9. The electronic device as claimed in claim 8, wherein said removable connector comprises at least one of a screw hole and a screw, a clamp, and a gripping material.

10. The electronic device as claimed in claim 7, further comprising a power supply connectable to the housing for charging the portable electronic device through the electronic device.

11. The electronic device as claimed in claim 10, wherein the power supply comprises at least one of a battery, a DC power source and an AC power source.

12. A method configured to connect an electronic device and a portable electronic device, comprising:
providing a replacement docking unit for the electronic device, the docking unit comprising
a cradle configured to removably accept a compatible portable electronic device;
a custom dock connector extending through an opening in a bottom portion of the cradle configured to connect to the compatible portable electronic device;
a circuit board to which the dock connector is integrally attached;

a wire connector integrally attached to the circuit board at a side thereof opposite the dock connector configured to connect to the electronic device, the dock connector and the wire connector communicatively coupled via the circuit board; and means provided in the cradle for removably connecting the replacement docking unit to the electronic device in place of an original docking unit of the electronic device.

13. The method of claim 12, wherein the means for removably connecting the docking unit to an electronic device includes a removable connector.

14. The method of claim 12, wherein said removable connector comprises at least one of a screw hole and a screw, a clamp, and a gripping material.

15. The method of claim 12, wherein the circuit board is attached to a side of the bottom of the cradle opposite the dock connector, and the docking unit further comprises a support bracket provided at a side of the circuit board opposite the cradle and removably attached to the cradle for supporting the circuit board and the dock connector.

16. The method of claim 12, wherein the wire connector of the docking unit receives a wire connector of an electronic device to which the docking unit is removably attached.

17. The method of claim 12, wherein the cradle is provided with an insert hook for receiving an insert to adjust an effective size of the cradle in accordance with a size of a portable electronic device to be inserted therein.

\* \* \* \* \*

(12) INTER PARTES REEXAMINATION CERTIFICATE (1081st)
United States Patent
Choi (10) Number: US 7,738,247 C1
(45) Certificate Issued: Mar. 31, 2015

(54) REMOVABLE AND REPLACEABLE DOCKING UNIT

(75) Inventor: Thomas Choi, Edison, NJ (US)

(73) Assignee: SDI Technologies, Inc., Rahway, NJ (US)

Reexamination Request:
No. 95/002,045, Jul. 18, 2012

Reexamination Certificate for:
Patent No.: 7,738,247
Issued: Jun. 15, 2010
Appl. No.: 11/620,292
Filed: Jan. 5, 2007

(51) Int. Cl.
*H05K 5/00* (2006.01)
*H02J 7/00* (2006.01)

(52) U.S. Cl.
CPC ..................... *H02J 7/0044* (2013.01)
USPC ..................................... 361/679.43

(58) Field of Classification Search
None
See application file for complete search history.

(56) References Cited

To view the complete listing of prior art documents cited during the proceeding for Reexamination Control Number 95/002,045, please refer to the USPTO's public Patent Application Information Retrieval (PAIR) system under the Display References tab.

*Primary Examiner* — Michael J. Yigdall (57) ABSTRACT

A removable/replaceable docking unit includes a cradle, a dock connector extending through an opening in a bottom portion of the cradle, a circuit board to which the dock connector is integrally attached, a wire connector integrally attached to the circuit board at a side thereof opposite the dock connector and the dock connector and the wire connector communicatively coupled via the circuit board and a removable connector provided in the cradle for removably connecting the docking unit to an electronic device.

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-17 are cancelled.

New claims 18-28 are added and determined to be patentable.

*18. The electronic device as claimed in claim 7, further comprising a hollow cylinder configured to receive a screw, the cylinder protruding from a bottom side of the cradle.*

*19. The electronic device as claimed in claim 7, further comprising a hollow cylinder protruding from a bottom side of the cradle.*

*20. The electronic device as claimed in claim 7, further comprising two hollow cylinders protruding from a bottom side of the cradle.*

*21. The electronic device as claimed in claim 7, further comprising exactly two hollow cylinders protruding from a bottom side of the cradle.*

*22. The electronic device as claimed in claim 7, further comprising:*
*a PCB support bracket configured for removable attachment to a bottom side of the cradle via screws screwed through the PCB support bracket.*

*23. The electronic device as claimed in claim 22, wherein the screws do not penetrate the cradle.*

*24. The electronic device as claimed in claim 7, further comprising a PCB support bracket; and non-conductive screw covers configured to cover screws between the PCB support bracket and the circuit board.*

*25. The electronic device as claimed in claim 7, further comprising a PCB support bracket and an insert hook; wherein the cradle, the PCB support bracket, and the insert hook are removably attached via screws screwed through the PCB support bracket, through the insert hook, and into a bottom side of the cradle.*

*26. The electronic device as claimed in claim 25, wherein the screws do not penetrate the cradle.*

*27. The electronic device as claimed in claim 7, further comprising a PCB support bracket; an insert hook; and non-conductive screw guides integral to the PCB support bracket and configured to surround screws between the PCB support bracket and the insert hook.*

*28. The electronic device as claimed in claim 7, further comprising an insert hook; and non-conductive screw guides integral to the cradle and configured to surround screws between the cradle and the insert hook.*

\* \* \* \* \*